US009896959B2

(12) United States Patent
Bertolotti et al.

(10) Patent No.: US 9,896,959 B2
(45) Date of Patent: Feb. 20, 2018

(54) PITCH ANGLE MEASURING SYSTEM AND METHOD FOR WIND TURBINES

(71) Applicant: SSB Wind Systems GmbH & Co. KG, Salzbergen (DE)

(72) Inventors: Fabio Bertolotti, Bad Bentheim (DE); Christian Bott, Rheine (DE)

(73) Assignee: SSB Wind Systems GmbH & Co. KG, Salzhergen (DE)

(*) Notice: Subject to any disclaimer, the term of this patent is extended or adjusted under 35 U.S.C. 154(b) by 658 days.

(21) Appl. No.: 14/566,174

(22) Filed: Dec. 10, 2014

(65) Prior Publication Data

US 2015/0204208 A1 Jul. 23, 2015

(30) Foreign Application Priority Data

Jan. 21, 2014 (DE) .................................. 140 00 207

(51) Int. Cl.
*F03D 11/00* (2006.01)
*F03D 1/00* (2006.01)
(Continued)

(52) U.S. Cl.
CPC ............. *F01D 21/003* (2013.01); *F01D 5/12* (2013.01); *F03D 7/0224* (2013.01); *F03D 17/00* (2016.05);
(Continued)

(58) Field of Classification Search
CPC .......... F03D 7/0224; F03D 17/00; F01D 5/12; F01D 21/003; F05D 2260/821; F05D 2270/327; F05D 2270/328; Y02E 10/723
See application file for complete search history.

(56) References Cited

U.S. PATENT DOCUMENTS 4,161,658 A * 7/1979 Patrick ................... F03D 7/0224
290/44
5,155,375 A * 10/1992 Holley ................... F03D 7/0224
290/44
(Continued)

FOREIGN PATENT DOCUMENTS

| CN | 101608912 A | 12/2009 |
|----|-------------|---------|
| CN | 101994650 A | 3/2011 |
| CN | 202500719 U | 10/2012 |
| CN | 102803719 A | 11/2012 |
| DE | 102007030268 A1 | 1/2009 |
| EP | 1835293 A1 | 9/2007 |

OTHER PUBLICATIONS

Liu, Yanping et al. "The Estimation of Pitch Angle in Pitch-Controlled Wind Turbine", In 2008 International Conference on Electrical Machines and Systems, pp. 4188-4191.

*Primary Examiner* — Igor Kershteyn
(74) *Attorney, Agent, or Firm* — Harness, Dickey & Pierce, P.L.C.

(57) ABSTRACT

The present invention relates to a wind turbine and a measuring system for determining the pitch angle of at least one blade relative to a hub of a wind turbine. The measurement comprises a first angular-velocity sensor (130) measuring a first angular velocity ($\phi$) around a first sensor axis ($e_1$), the first angular-velocity sensor (130) fixedly attached to the at least one blade (100) with a first predetermined orientation selected to produce a first projection of the main rotational axis (32) onto the first sensor axis ($e_1$), a second angular-velocity sensor (140) measuring a second angular velocity ($\beta$) around a second sensor axis ($e_2$), the second angular-velocity sensor (140) fixedly attached to the at least one blade (100) with a second predetermined orientation selected to produce a second projection of the main rotational axis (32) onto the second sensor axis ($e_2$), the first sensor axis ($e_1$) and the second sensor axis ($e_2$) being linearly independent, and a first computational unit (160)

(Continued)

computing a computed pitch angle ($\theta_{1c}$) based on of the first angular velocity ($\phi$) and the second angular velocity ($\beta$).

The invention relates also to a method for determining an azimuthal position and azimuthal rotational velocity of the at least one blade relative to the nacelle, the azimuthal position being defined by the rotational motion of the hub relative to the nacelle.

14 Claims, 7 Drawing Sheets

(51) Int. Cl.
  *F01D 21/00* (2006.01)
  *F03D 7/02* (2006.01)
  *F01D 5/12* (2006.01)
  *F03D 17/00* (2016.01)
(52) U.S. Cl.
  CPC ... *F05B 2260/821* (2013.01); *F05B 2270/327* (2013.01); *F05B 2270/328* (2013.01); *Y02E 10/723* (2013.01)

(56) References Cited

U.S. PATENT DOCUMENTS

| | | | | |
|---|---|---|---|---|
| 6,856,041 | B2* | 2/2005 | Siebenthaler | F03D 7/0224 290/44 |
| 7,160,083 | B2* | 1/2007 | Pierce | F03D 7/0204 415/118 |
| 7,728,452 | B2* | 6/2010 | Arinaga | F03D 7/0224 290/44 |
| 7,763,989 | B2* | 7/2010 | Kinzie | F03D 7/0224 290/44 |
| 8,757,003 | B1* | 6/2014 | Makaremi | G01M 5/0016 73/847 |
| 2009/0295159 | A1* | 12/2009 | Johnson | F03D 7/0224 290/44 |
| 2010/0209245 | A1* | 8/2010 | Migliori | F01D 17/10 416/1 |
| 2010/0226772 | A1* | 9/2010 | Deering | F03D 7/0204 416/1 |
| 2011/0001319 | A1 | 1/2011 | Brath et al. | |

* cited by examiner

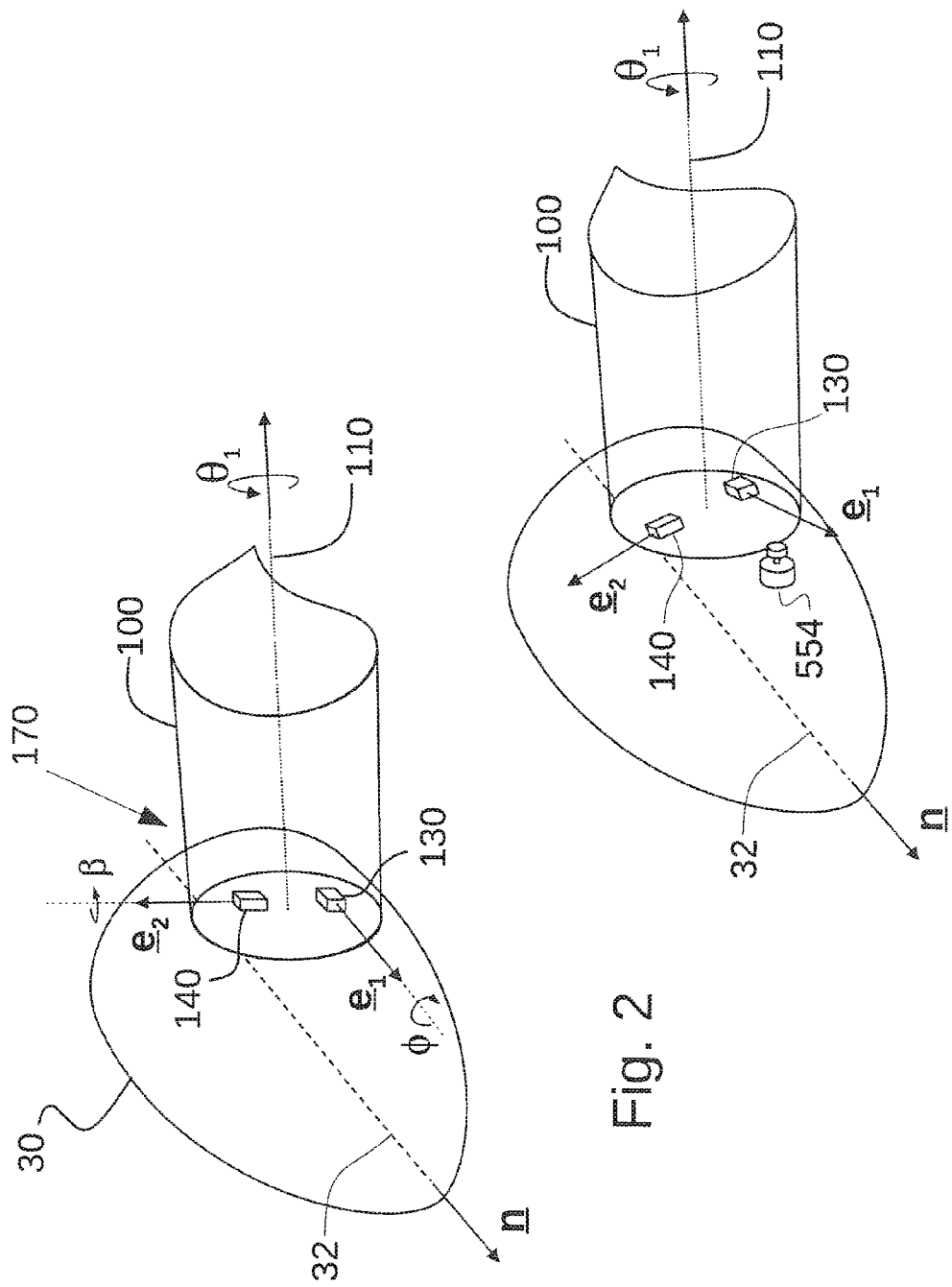

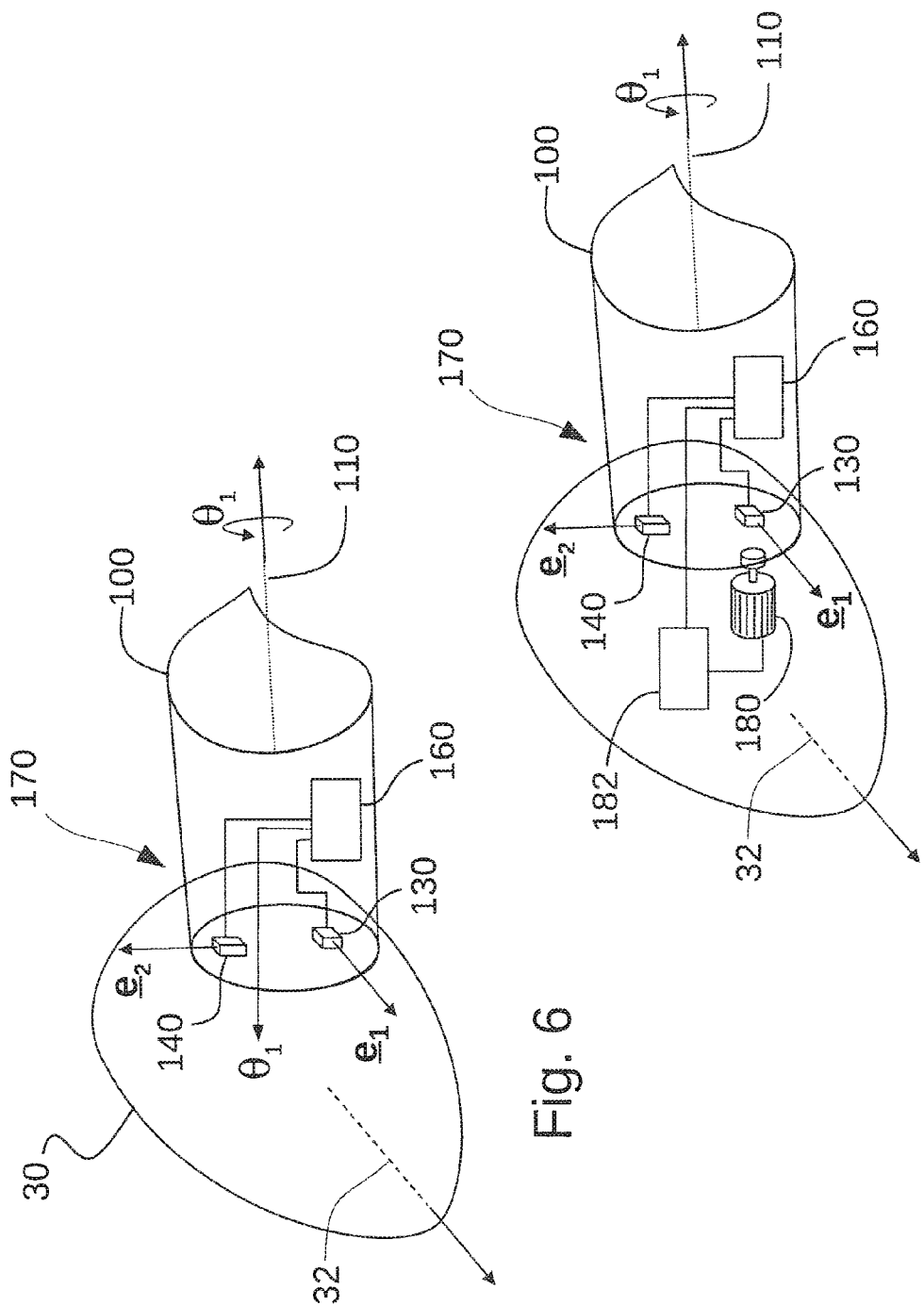

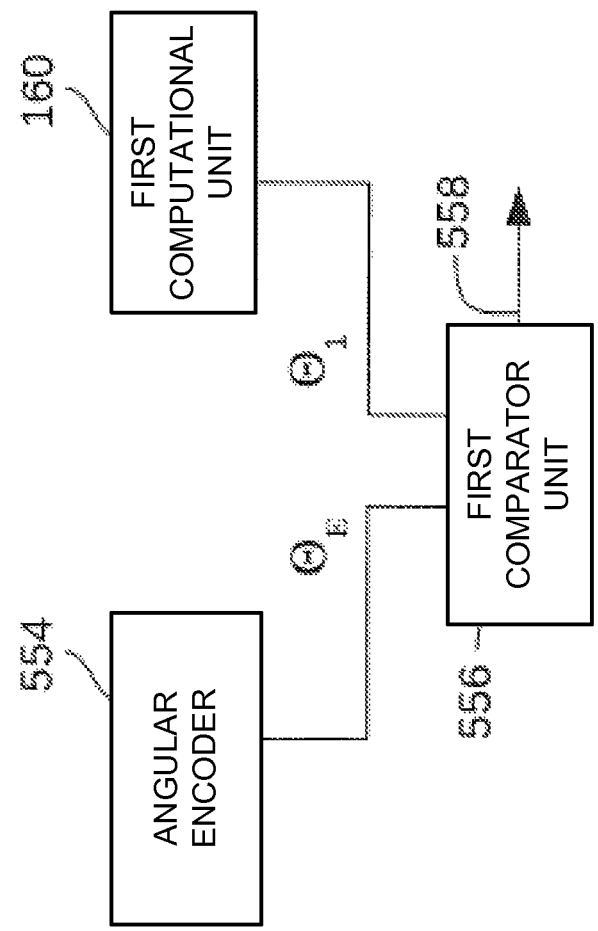

PITCH ANGLE MEASURING SYSTEM AND METHOD FOR WIND TURBINES

CROSS-REFERENCE TO RELATED APPLICATIONS

This application claims the benefit and priority of European Application No. 14000207.2, filed Jan. 21, 2014. The entire disclosure of the above application is incorporated by reference.

TECHNICAL FIELD

The present invention relates to a wind turbine and a measuring system for determining at least a blade pitch angle of a blade relative to a hub of a wind turbine. The invention relates also to a method for determining a pitch angle of at least one blade of a wind turbine.

BACKGROUND

Wind turbines extract power from the wind to generate electrical power. The aerodynamic power in the wind is changed using one or more blades into rotational power that drives a generator. To maximize the energy extracted during an entire year of operation at a particular site, the generator's maximum power level is chosen well below the value of the aerodynamic power associated with the maximum wind velocity expected at the site. The wind speed at which the extracted rotational power matches the maximum generator power is called the rated speed of the wind turbine.

Since the rated speed is well below the maximum wind speed at the site, it follows that there are many time periods during which the available aerodynamic power is greater than the generator's maximum power level. Accordingly, wind turbines are provided with a means for extracting a controllable and selectable amount of rotational power from the available aerodynamic power. Most typical in the art are means that change the aerodynamic angle of attack of the blade, said means comprising rotationally attaching the blade to a turbine hub, so as to allow rotation about a pitch axis running essentially along the span of the blade, and a blade-pitch actuator for rotationally moving the blade by a commanded blade pitch angle about the pitch axis, thereby changing the orientation of the blade with respect to the hub, and with respect to the incoming wind.

The commanded blade pitch angle is computed by the turbine central control unit. To achieve acceptable operational safety, the motion of the blade pitch angle must be done using closed-loop control, wherein the blade pitch angle is measured independently of the blade-pitch actuator and the measured angular value reported to the turbine central control unit, along with the rotational speed of the hub. The measurement of the blade pitch angle, with respect to the hub, is done via electro-mechanical encoders driven by the blade motion. Due to operational safety requirements, the turbine cannot be operated and must be shut down when the turbine central controller looses the ability to track the blade pitch angle of any of the blades used by the wind turbine.

Mechanical pitch-angle encoders suffer from several shortcomings. One such shortcoming is susceptibility to mechanical failures in the drive connecting the blade's body to the internal workings of the encoder. A second shortcoming is the loss of accuracy due to abrasion and wear in said drive. A third shortcoming is the loss of accuracy when the encoder and drive are misaligned following a service technician mistakenly stepping on the unit during servicing. It is thus, desirable to have a measuring system for measuring at least the blade pitch-angle of the blade, the measuring system being built such that is free of mechanical failure, wear and tear. It is furthermore desirable to have said measuring system additionally measure the hub's rotational speed, and most desirable to have said measuring system additionally measuring the blade's azimuthal angular rotation from a predetermined blade azimuthal position.

The rotational position and velocity of the hub can be measured using the combination of an accelerometer and a gyroscope. The gyroscope provides a measure of the rotational rate, and integration in time of the gyroscope signal provides a measure of the rotor angular position. However, small rate errors in the measurement of the rotational rate are unavoidable in practice, so that the computed rotor angular position includes an ever increasing error in time due to the continued accumulation of the small rate errors in the integration process. To bound this accumulation of errors, it is well known in the art of inertial motion sensors to combine the signals of a gyroscope with those of an accelerometer.

EP-A 1835,293 describe a wind turbine and a method of determining at least one rotation parameter of a wind turbine rotor, wherein an accelerometer bounds the error of the rotor angular position when the angular position is calculated by integrating in time the signal from a gyroscope.

DE-A 102007030 shows a method for indirect determining of dynamic values of a wind- or water turbine using any measuring sensors. An accelerometer is also used to measure forces present in the wind turbine and use the measured forces to detect the rotational rate of the wind turbine.

The two known methods use the presence of gravitational acceleration in the measured signal to provide a ground-fixed reference frame against which the rotational rate of the hub can be determined. The computational method fundamentally depends on the identification of gravity in the accelerometer signals. The gravity signal produces a sinusoidal signal that varies with the rotor azimuthal angle, hence the signal displays a periodicity with period equal to the time the rotor takes to complete one revolution. Accordingly, at least a full period is needed to determine the phase of the gravity sinusoidal signal, via peak-and-through detection or equivalent method, with usable accuracy. Consequently, the computation of the rotor speed is a time-delayed, or time averaged, quantity and not an instantaneous measurement.

What is desired is a method to measure the pitch-angle of a wind-turbine blade that is free of electro-mechanical encoders, and that, furthermore, can provide an instantaneously accurate measurement of pitch-angle, and that, furthermore, the measurement is free drift and similar errors due to the accumulation in time of measurement inaccuracies or errors.

Therefore it is an objective of the invention to provide a measuring system for determining at least the pitch angle of at least one blade relative to the turbine hub. It is a further objective of the present invention to provide a measuring system for determining the blade pitch angle that is free from the accumulation of errors due to time integration of a time-varying signal. It is a further objective of the present invention to provide a measuring system for determining the rotational speed of the hub. It is a further objective of the present invention to provide a measuring system for determining the azimuthal angular position of the hub relative to a predetermined orientation. It is a further objective of the present invention to provide an improved wind turbine having a measuring system measuring at least the pitch angle of at least one blade relative to the turbine hub.

The mentioned objectives are solved by a pitch-angle measuring system for a wind turbine and a method of determining the pitch angle of at least one blade relative to the turbine. Various aspects, advantages and features of the invention are apparent from the dependent claims and the accompanying drawings.

BRIEF DESCRIPTION OF DRAWINGS

FIG. 2 shows components of the invention associated with one blade, including two angular-velocity sensors, and the blade at a first pitch angle.

FIG. 3 shows components of the invention associated with one blade, including two angular-velocity sensors, and the blade after rotation into a second pitch angle.

FIG. 6. shows components of the invention associated with one blade, including two angular-velocity sensors and the first computational unit.

FIG. 7. shows components of the invention associated with one blade, including two angular-velocity sensors, the first computational unit, the blade-pitch actuator, and the pitch control unit.

FIG. 10. shows a simplified diagram of components that are used to generate a pitch difference signal for the invention.

SUMMARY

Figure 1:
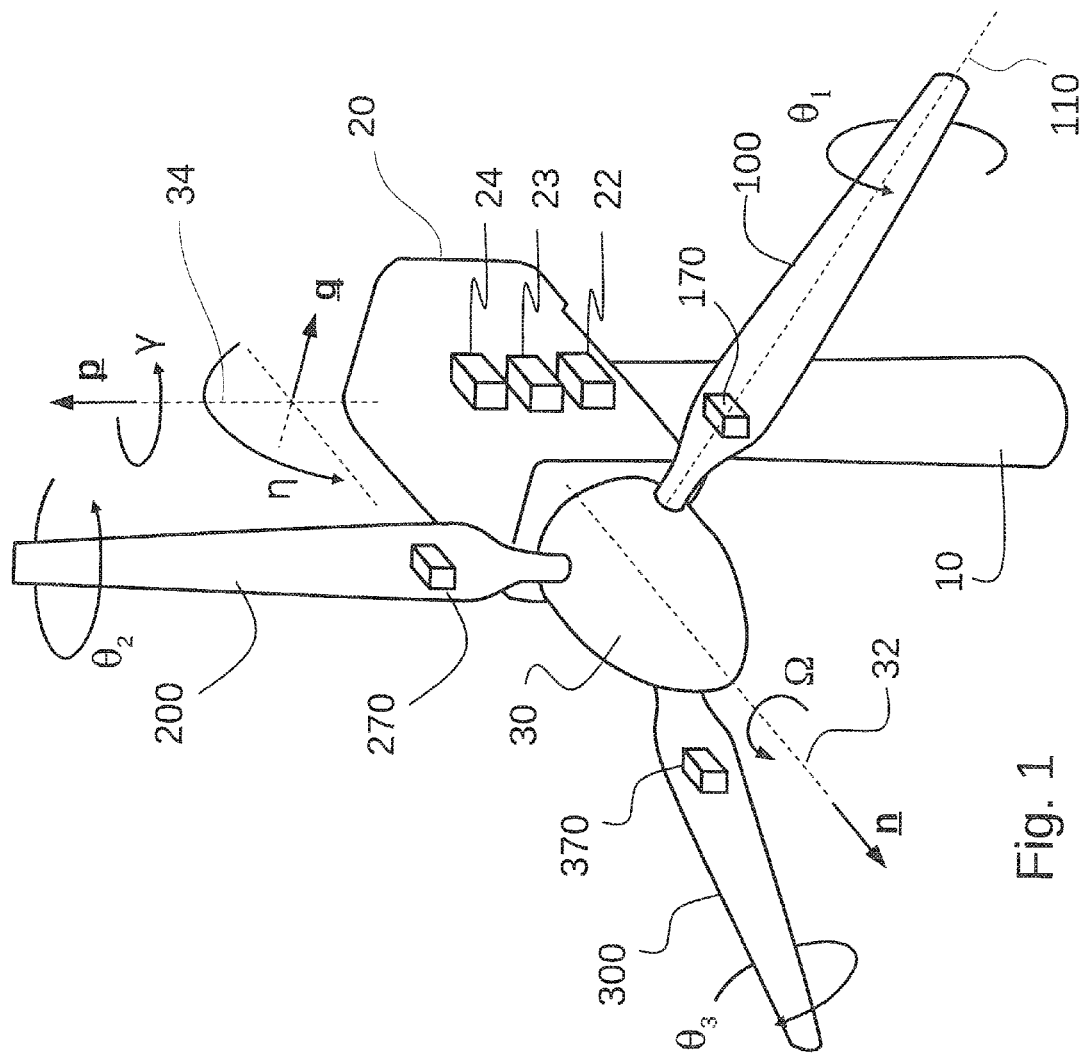
FIG. 1 shows a typical wind turbine with three blades, rotational motions of some turbine components, and components of the invention.

A wind turbine comprises a hub that rotates relative to a nacelle. The rotational motion of the hub drives an electrical generator located at least partially inside the nacelle. At least one blade is rotationally attached to the hub to allow only a rotation of the blade relative to the hub about a pitch axis. This rotation is typically achieved with the use of a blade bearing located at the root of the blade. Excluding small material deformations of the hub itself, the orientation of the blade root relative to the hub is completely and uniquely defined by a blade pitch angle that indicates the rotational movement of the blade root about the pitch axis from a predefined blade position. The rotational motion of the hub defines a main rotational axis, about which the hub rotates with a rotational rate $\Omega$.

The inventive method of determining at least the pitch angle $\theta_1$ of at least one blade relative to the turbine hub comprises the steps of fixedly attaching a first angular-velocity sensor to the blade for measuring a first angular velocity $\phi$ about a first sensor axis $e_1$, the fixed attachment being done at a first predetermined orientation that defines the orientation of first sensor axis $e_1$ relative to the blade.

As a consequence of the fixed attachment, and of the rotor kinematics, the first angular velocity $\phi$ is functionally dependent on both the rotational rate $\Omega$ and the pitch angle $\theta_1$. One can write this dependency as $\phi\ (\Omega,\ \theta_1)$. A second angular-velocity sensor is positioned in the wind turbine to generate a second angular velocity $\beta$ that is functionally dependent on the rotational rate $\Omega$. The position of the second angular velocity sensor is chosen such that the variation of the second angular velocity $\beta$ with the pitch angle $\theta1$, including the case of zero variation, is different from the variation of the first angular velocity $\phi$ with the pitch angle $\theta1$. Consequently, the determination of the pitch angle $\theta1$ is possible once the values of the first angular velocity $\phi$ and $\beta$ the second angular velocity $\beta$ are known. Accordingly, the angular rates $\phi$ and $\beta$ are communicated to a first computational unit that determines a computed pitch angle $\theta1C$ indicative of the blade pitch angle $\theta1$.

In the preferred embodiment the second angular velocity sensor measure the second angular velocity $\beta$ about a second sensor axis $e_2$ that is fixedly attached to the blade at a second predetermined position. This second predetermined position is chosen such that the first sensor axis e1 and the second sensor axis $e_2$ are linearly independent. The linear independence of vectors $e_1$ and $e_2$ ensures that the variation of $\phi\ (\Omega, \theta1)$ and $\beta(\Omega,\ e_1)$ with $\theta_1$ are functionally independent, thereby allowing the pitch angle $\theta_{1C}$ to be computed once the values of the first angular velocity $\phi$ the second angular velocity $\beta$ are known. Accordingly, the angular rates $\phi$ and $\beta$ are communicated to a first computational unit that determines a computed pitch angle $\theta_{1C}$ indicative of the blade pitch angle $\theta_1$.

In an alternative embodiment, the second angular velocity sensor measure the second angular velocity $\beta$ about a second sensor axis $e_2$ that is aligned with the main rotational axis of the rotor. The magnitude of $\beta$ is then equal to the main rotational rate D and does not vary with pitch angle $\theta_1$.

Consequently, the variation of the first angular velocity $\phi$ with the pitch angle $\theta_1$ is different from the variation of the second angular velocity $\beta$ with the pitch angle $\theta_1$, thereby allowing the pitch angle $\theta_{1C}$ to be computed once the values of the first angular velocity $\phi$ the second angular velocity $\beta$ are known. Accordingly, the angular rates $\phi$ and $\beta$ are communicated to a first computational unit that determines a computed pitch angle $\theta_{1C}$ indicative of the blade pitch angle $\theta_1$.

DETAILED DESCRIPTION

In reference to FIG. 1, a wind turbine 1 (see FIG. 8) comprises a tower 10, a nacelle 20 attached to the tower, and a hub 30 rotationally attached to the nacelle 20. The hub is adopted to receive and structurally support one or more blades used for transforming the aerodynamic power of the wind into mechanical power. The rotational motion of the hub relative to the nacelle defines a main rotational axis 32. The rotational position of the hub around the rotational axis 32 defines the azimuthal position $\psi$ (FIG. 8) of the rotor. The magnitude, in radians, of the rotor azimuthal position $\psi$ varies from zero to $2\pi$ as the rotor performs one complete revolution. The direction of the main rotational axis can be mathematically describes by a unit vector n. The hub rotates around the rotational axis 32 with a main rotational rate $\Omega$. It is well known in the art that the main rotational axis 32 and the main rotational rate $\Omega$ can be mathematically combined into the vector $\Omega=\Omega n$. Vector notation is used herein to facilitate the description of certain aspects of the invention.

A first blade 100 is rotationally attached to the hub and defines a pitch axis 110 (see FIG. 2) for rotation thereabout. The rotational angular displacement of the first blade 100 around the pitch axis 110 is commonly denoted in the art as the blade pitch angle, herein denoted $\theta_1$. In particular, the blade pitch angle $\theta_1$ defines the angular displacement of the first blade 100 from a predefined first blade orientation relative to the hub 30. This predefined first blade orientation can be defined, for example, by geometric markings on the hub and the first blade. The rotational attachment of first blade 100 to the hub is preferably done through a blade-bearing connecting the root of first blade 100 to the hub 30, so that, excluding small motions due to material deformations of the hub, of the blade, and of the blade-bearing, the orientation of the root of first blade 100 relative to the hub 30 is completely and uniquely defined by a blade pitch angle. Most turbines in use today have three blades, as shown in FIG. 1, where a second blade is shown at 200 and a third blade is shown at 300.

To keep the electrical power produced by the wind turbine within a desired range, the power extracted from the wind by each blade must be controlled. This control is achieved by changing the blade pitch angle of each blade to affect the aerodynamic angle of attack of each blade. Thus, for the purpose of electrical power control, it is very beneficial to measure directly the blade pitch angle of each blade.

Accordingly, the invention provides a first pitch-angle measuring system 170 in first blade 100 capable of providing a computed pitch angle $\theta_{1C}$ (not shown) indicative of the blade pitch angle $\theta_1$ of first blade 100. Most preferably, each blade is equipped with its own pitch-angle measuring system. In reference to FIG. 1, second blade 200 has a second pitch angle measuring system 270 providing a second computed pitch angle $\theta_{2C}$ (not shown) indicative of the blade pitch angle $\theta_2$ of second blade 200, and third blade 300 has a third pitch-angle measuring system 370 providing a third computed pitch angle $\theta_{3C}$ (not shown) indicative of the blade pitch angle $\theta_3$ of third blade 300. The second and third pitch angle measuring systems are preferably of the same design and function as the first pitch-angle measuring system, as described herein.

In reference to FIG. 2, the first pitch-angle measuring system 170 comprises a first angular-velocity sensor 130 fixedly attached to the first blade 100 at a first predetermined orientation relative to the first blade. A gyroscope is an example of such an angular-velocity sensor. This first angular-velocity sensor 130 measures a first angular velocity $\phi$ about a first sensor axis indicated by unit vector $e_1$. This first sensor axis $e_1$ is fixed relative to the body of the first angular-velocity sensor 130, hence it is also fixed relative to the first blade 100 itself. The first predetermined orientation is chosen such that the first sensor axis $e_1$ is not essentially parallel to the pitch axis 110, so that a measurable projection of the main rotational axis 32 onto the first sensor axis $e_1$ is obtained for at least some range of the blade pitch angle $\theta_1$ of the first blade. In vectorial form, $$\phi=\Omega e_1$$

Figure 8:
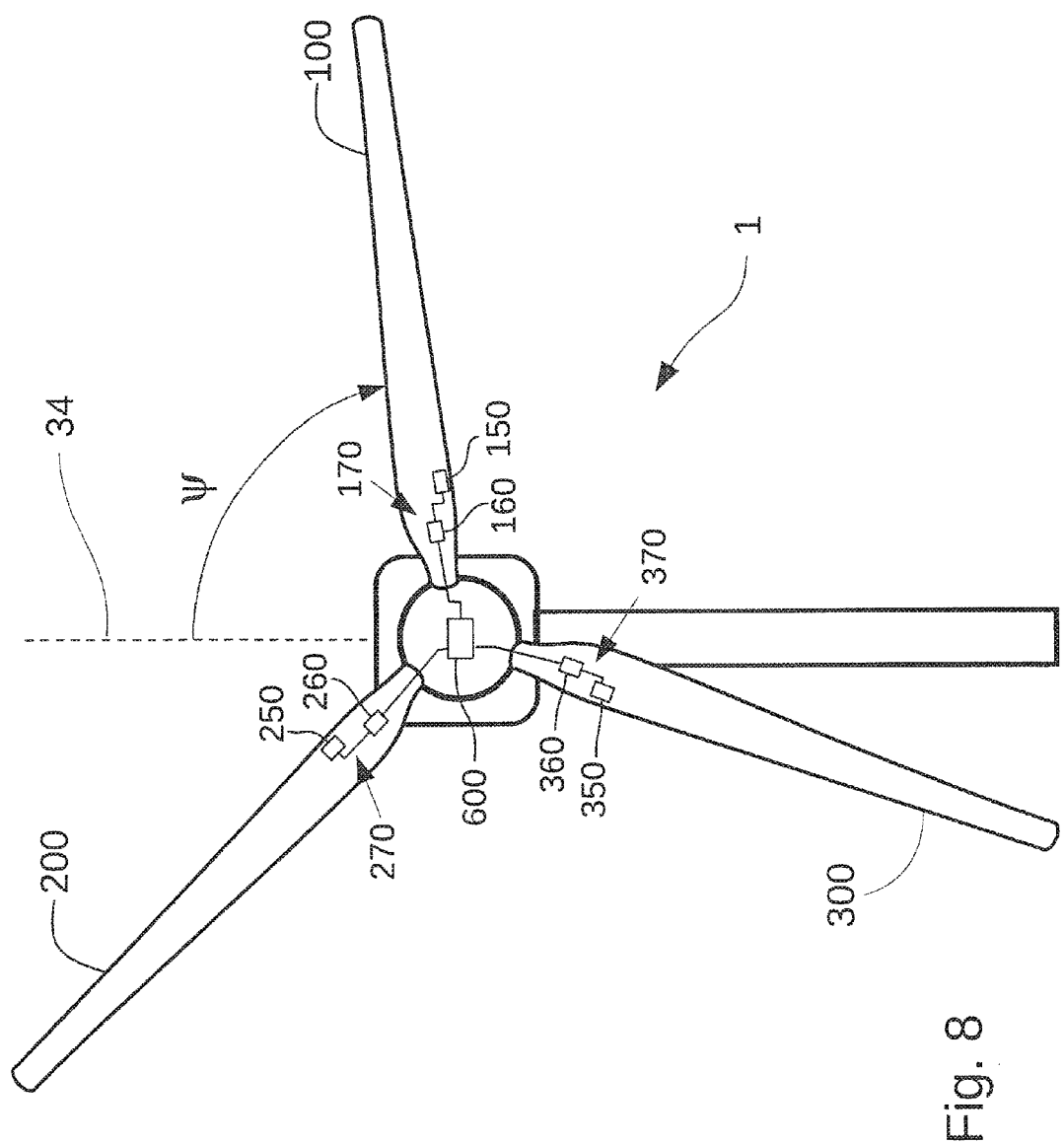
FIG. 8. shows components of the invention associated with three blades, including angular-velocity sensors, and the computational unit for computing the turbine yaw-rate about the tower axis.

The first angular velocity $\phi$ is communicated to a first computational unit 160 (see FIG. 8).

In a first embodiment of the invention, the pitch-angle measuring system 170 comprises a second angular-velocity sensor 24 (see FIG. 1) for measuring the angular velocity $\Omega$ about the main rotational axis n. The first computational unit 160 (see FIG. 8) receives the measured angular velocities $\phi$ and $\Omega$ and computes the computed pitch angle $\theta_{1C}$ indicative of the blade pitch angle $\theta_1$ based from the magnitude of, together with the measured value of the main rotational rate $\Omega$ of FIG. 1:

$$\theta_{1C}=c_1 \arccos(\phi/\Omega)+c_2,$$

where "$c_1$" and "$c_2$" are constants.

The main limitation of this embodiment lies in the inability of the arc-cosine function to distinguish positive pitch angles from negative pitch angles. However, since the blade pitch angle is essentially restricted to the range of zero and ninety degrees in operation, the limitation can be overcome by choosing the first predetermined orientation so that $\phi$ is positive when the blade pitch angle takes on the lowest value expected during operation.

In reference to FIG. 7, the pitch-angle measuring system 170 comprises a second angular-velocity sensor 140 fixedly attached to the first blade 100 at a second predetermined orientation relative to the first blade and measures a second angular velocity $\beta$ about a second sensor axis indicated by unit vector $e_2$. This second sensor axis $e_2$ is fixed relative to the body of the second angular-velocity sensor 140, hence it is also fixed relative to the first blade 100 itself. The second predetermined orientation is chosen such that a measurable projection of the main rotational axis 32 onto the second sensor axis $e_2$ is obtained for at least some range of the blade pitch angle $\theta_1$ of the first blade 100. In vectorial form, $$\beta=\Omega e_2$$

Additionally, the second predetermined orientation is chosen such that the vectors $e_1$ and $e_2$ are linearly independent (here the meaning of linearly independent follows the standard meaning in the field of mathematics, namely that there do not exists scalars a and b such that $a\,e_1+b\,e_2=0$). Consequently, the combination of vectors $e_1$ and $e_2$ form a basis spanning a plane having plane normal m (not shown). The linear independence of vectors $e_1$ and $e_2$ ensures that the variation of $\phi (\Omega, \theta_1)$ and $\beta(\Omega, \theta_1)$ with $\theta_1$ are functionally independent, thereby allowing the pitch angle $\theta_{1C}$ to be computed once the values of the first angular velocity $\phi$ the second angular velocity $\beta$ are known.

The first angular velocity $\phi$ and the second angular velocity $\beta$ are communicated to the first computational unit 160. This computational unit computes the computed pitch angle $\theta_{1C}$ based on the numerical value of the first angular velocity $\phi$ relative to the numerical value of the second angular velocity $\beta$. In particular, since both the first and the second angular-velocity sensors 130 and 140 respectively, are fixedly attached to the first blade 100, and since the first blade rotates with the blade pitch angle about the pitch axis 110, it follows that the first sensor axis $e_1$ and the second sensor axis $e_2$ have an orientation in space that is functionally dependent on the blade pitch angle $\theta_1$. This dependency is visible by comparing the orientation of $e_1$ and $e_2$ in FIG. 2 with the corresponding orientations after a change in blade pitch angle, as shown in FIG. 3. It then follows that the first angular velocity $\phi=\Omega\,e_1$ and the second angular velocity $\beta=\Omega\,e_2$ are also functionally dependent on the blade pitch angle $\theta_1$. These functional relations are invertible, whereby the computed pitch angle $\theta_{1C}$ can be computed based on the value of $\phi$ relative to $\beta$. For the case when $e_1$ and $e_2$ are perpendicular to each other, $$\theta_{1C}=c_3 \arctan(\phi,\beta)+c_4.$$

where "$c_3$" and "$c_4$" are constants.

The constant "$c_4$" is chosen such that the value of the computed pitch angle $\theta_{1C}$ takes on a predetermined value, such as 0, when the first blade 100 is positioned at the predefined orientation relative to the hub. We note that in the case that $e_1$ and $e_2$ are not perpendicular to each other, the well known application of covariant and contra variant vectors, $e_1$, $e_2$, $e^1$, $e^2$, where $e_j\, e^i = \delta^i_j$ (the Kronecker delta) can be used to calculate the computed pitch angle $\theta_{1C}$. Other approaches can be used, such as building and storing a numerical table correlating known values of $\theta_{1C}$ with the associated values of $\phi$ and $\beta$ for later access and later calculating the computed pitch angle $\theta_{1C}$ via table look-up when given the values of $\phi$ and $\beta$. This approach is preferred when the first and second sensor axis $e_1$ and $e_2$ are not known, or measurable, to sufficient accuracy, and the numerical table is built with the assistance of a conventional pitch-angle electromechanical encoder 554 (see FIG. 3).

We note that in addition to the blade pitch angle $\theta_{1C}$, the main rotational rate $\Omega$ can be computed from the numerical values of the first angular velocity $\phi$ and the second angular velocity $\beta$. In the case that $e_1$ and $e_2$ are perpendicular 20 to each other, and the plane spanned by $e_1$ and $e_2$ has the plane-normal m (not shown) that is perpendicular to the main rotational axis, n, then $$\Omega = (\phi^2 + \beta^2)^{1/2}$$

It is straight forward and well known in the art to define equivalent equations in the cases when the plane-normal m is not perpendicular to the main rotational axis, n, and/or when $e_1$ and $e_2$ are not perpendicular to each other. In the embodiment of FIG. 7, the first and second sensor axis $e_1$ and $e_2$ are essentially perpendicular to each other. Additionally, to minimize the effect of centripetal acceleration and of blade bending on the measurement of angular velocity, the first and second angular-velocity sensors 130 and 140, respectively, are preferably positioned near the root of the blade.

Figure 4:
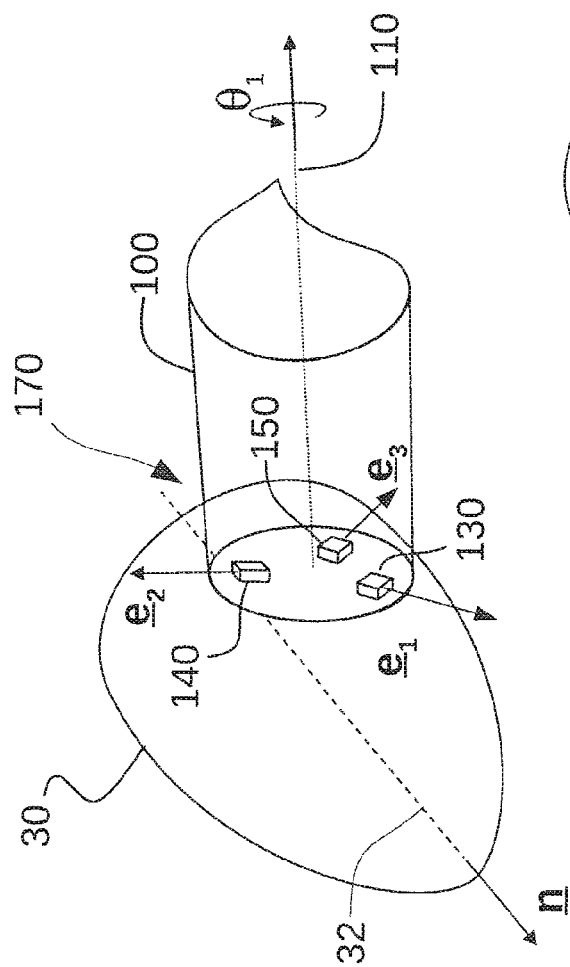
FIG. 4. shows components of the invention associated with one blade, including three angular-velocity sensors with associated sensor axes essentially contained in one plane.
Figure 5:
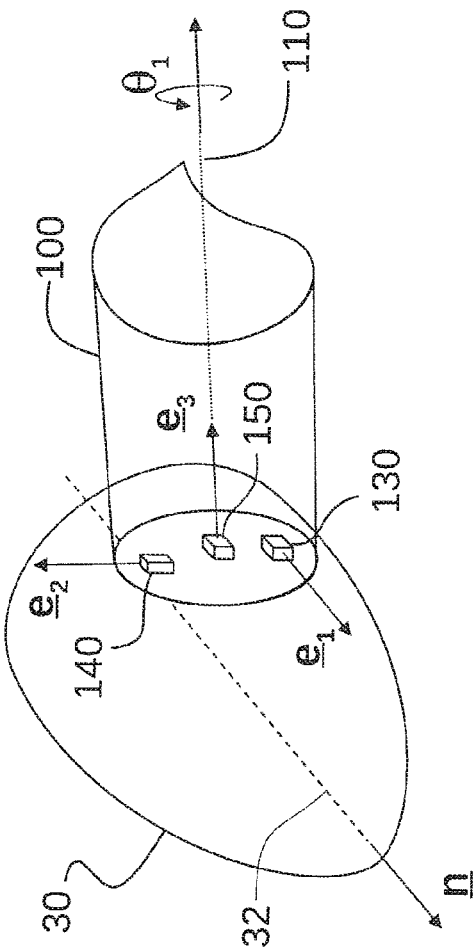
FIG. 5. shows components of the invention associated with one blade, including three angular-velocity sensors with associated sensor axes forming an essentially orthogonal basis.

In reference to FIG. 4, a further embodiment of the invention extends the pitch-angle measuring system 170 by incorporating a third angular-velocity sensor 150 fixedly attached to the first blade 100 at a third predetermined orientation relative to the first blade, and measuring a third angular velocity $\lambda$ (not shown) around a third sensor axis indicated by unit vector $e_3$. The measurement $\lambda$ is communicated to the first computational unit 160 (see FIG. 8). When the third sensor axis $e_3$ is not essentially orthogonal to the plane spanned by $e_1$ and $e_2$, the computation of the computed pitch angle $\theta_{1C}$ is made redundant by virtue of a first additional pitch-angular value being computable from the relative values of $\lambda$ and $\phi$ as well as a second additional pitch-angular value being computable from the relative values of $\lambda$ and $\beta$. The first and second additional angular values provide additional estimates for the blade pitch angle $\theta_1$ so that inclusion of the first and second additional values in the calculation of the computed pitch-angle $\theta_{1C}$ can be used to reduce error by employing, for example, averaging, and for condition-monitoring of each of the angular-velocity sensors by cross-checking the agreement between the pitch angular values given by the different angular-velocity pairings.

A further level of redundancy is obtained in a further embodiment of the invention, wherein the wind turbine 1 further comprises angular encoders to measure the blade pitch angle. Examples of such encoders are electromechanical encoders resolving one complete revolution of the blade pitch angle into a discrete and predetermined amount of values, typically between 1024 and 16384 values.

In reference to FIG. 3, angular encoder 554 produces an encoder signal $\theta_{1E}$ indicative of the blade pitch angle of first blade 100. The encoder signal and the computed pitch angle $\theta_{1C}$ from first computational unit 160 are communicated to a first comparator unit 556 (see FIG. 10), which monitors the deviation, or difference, between the encoder signal $\theta_{1E}$ and the computed pitch angle $\theta_{1C}$. A pitch-differential signal 558 is generated by the first comparator unit 556 indicative of the difference between $\theta_{1E}$ and $\theta_{1C}$. Possible further actions taken based on the value of the pitch-differential signal 558 include, but are not limited to, raising an alarm indicating hardware malfunction.

Back to FIG. 1, the values of the angular velocities $\phi$, $\beta$, $\lambda$ measured, respectively, by the angular-velocity sensors 130, 140, 150 are dominated by the main rotational rate $\Omega$. However, tilting angular rate $\eta$ of the nacelle in the tilting direction indicated by the unit vector q, caused by bending motions of the tower 10, as well as yawing angular rate $\gamma$ of the nacelle in the yaw direction indicated by unit vector p, caused by changing angular position about the tower axis 34, also contribute to the instantaneous angular velocity of the main rotational axis 32, $$\Omega = \Omega n + \eta U q + \gamma p$$

so that contributions from $\eta$ and $\gamma$ appear in the values of angular velocities $\phi$, $\beta$, and $\lambda$. The angular rates $\eta$ and $\gamma$ of the main rotational axis 32 are independent of the blade pitch angle of the first blade. Hence, when the values of the $\eta$ and $\gamma$ angular rates are non zero, they must preferably be accounted for, and compensated for, by the first computational unit 160 in the computation of the computed pitch-angle $\theta_{1C}$. When signals indicative of the angular rates $\eta$ and $\gamma$ are available, they are sent to the first computational unit 160. In a further embodiment of the invention, a tilt-rate sensor 22 is used to measure the tilting angular rate $\eta$ and a yaw-rate sensor 23 is used to measure the yawing angular rate $\gamma$ of the main rotational axis 32. Additionally, a hub angular encoder 24 measures the first blade azimuthal position $\psi$ (see FIG. 8). The tilting angular rate $\eta$, the yawing angular yaw $\gamma$ and the first blade azimuthal position $\psi$ are communicated to the first computational unit 160, where they are used to compensate for the $\eta$ and $\gamma$ angular rates in the computation of the computed pitch-angle $\theta_{1C}$.

In a further embodiment for a turbine having two or more blades, as shown in FIG. 4, the third angular-velocity sensor 150 is fixedly positioned relative to first blade 100 such that the third sensor axis $e_3$ points essentially along the pitch axis 110. For notational elegance, we rename the signal generated by third angular-velocity sensor 150 as $\lambda_{100}$ (not shown). The same construction is used for pitch-angle measuring system 270, wherein a third angular-velocity sensor 250 measures the angular velocity $\lambda_{200}$ of second blade 200 about that blade's pitch axis, and pitch-angle measuring system 370 has a third angular-velocity sensor 350 (see FIG. 8) that measures the angular velocity $\lambda_{300}$ of third blade 300 about that blade's pitch axis. A tilt-and-yaw computational unit 600 (see FIG. 8) receives the three angular velocities $\lambda_{100}$, $\lambda_{200}$, $\lambda_{300}$ and the first blade 100 azimuthal position $\psi$ (FIG. 8), and performs a multi-blade coordinate transformation, also known as a Coleman transformation in the art, $$K_0 = \lambda_{100} + \lambda_{200} + \lambda_{300}$$

$$k_s = \lambda_{100} \sin(\psi) + \lambda_{20} \sin(\psi - 2\pi/3) + \lambda_{300} \sin(\psi - 4\pi/3)$$

$$k_c = \lambda_{100} \cos(\psi) + \lambda_{200} \cos(\psi - 2\pi/3) + \lambda_{300} \cos(\psi - 4\pi/3)$$

to obtain the constant, $k_0$, sine, $k_s$, and cosine, $k_c$, components of the angular velocities $\lambda_{100}$, $\lambda_{200}$, $\lambda_{300}$. The values of the η and γ angular rates are proportional to $k_s$ and $k_c$, and can be easily determined from the values of $k_s$ and $k_c$. The values of the η and γ angular rates are then communicated to each first computational unit 160, 260, 360 (see FIG. 8) for the computation of computed pitch angles $\theta_{1C}$, $\theta_{2C}$, and $\theta_{3C}$, respectively. For the benefit of compactness, the first, second and third angular velocity measurement systems can be packaged together in a single unit, for example three MEMS gyroscopes on a single chip.

Most preferably, the orientation of the orientation of the first sensor axis $e_1$, of the second sensor axis $e_2$, and of the third sensor axis $e_3$ are chosen to be mutually orthogonal so that the combination of $e_1$, $e_2$, and $e_3$ form an orthogonal basis for three-dimensional space. During normal operation, the blade pitch angle $\theta_1$ is changed as required by turbine control needs, and this change produces a pitch angular rotational rate about the blade's pitch axis. This orthogonality, together with alignment of the third sensor axis $e_3$ along the pitch axis, removes the pitch angular rotational rate from the first angular velocity φ around the first sensor axis $e_1$ and from the second angular velocity β about the second sensor axis $e_2$, thereby simplifying the computation of the computed pitch angle $\theta_{1C}$.

In a further embodiment, the nacelle angular tilt rate η is not measured directly, but is estimated from a measurement of the wind thrust and from knowledge of the tower bending stiffness, or, alternatively, from an estimation of the wind thrust via, for example, a measurement of the generated electrical power, and knowledge of the tower bending stiffness. The rotor azimuthal position ψ is usually defined as the angle between the first blade 100 and the vertical (e.g. the vertical position relative to the nacelle), and we will use this definition herein. Accordingly, the terminology "rotor azimuthal position" and "first blade azimuthal position" are herein used interchangeably, and both define the same angle ψ.

Figure 9:
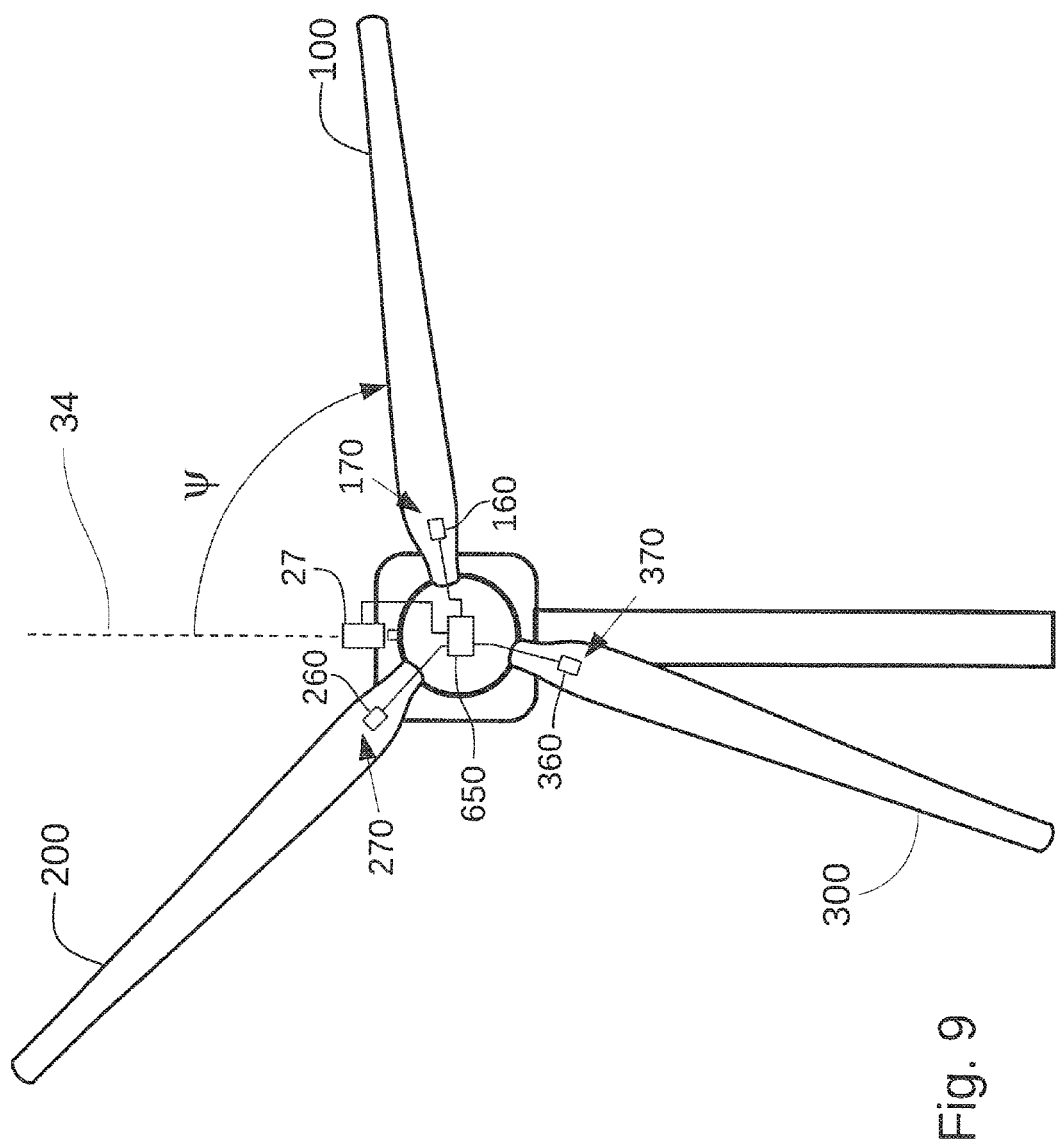
FIG. 9. shows components of the invention associated with three blades, including angular-velocity sensors, and the computational unit for computing the blade's azimuthal angle.

In the preferred embodiment, the first blade azimuthal position ψ is measured by an angular encoder 24 measuring the hub rotational position relative to a predetermined reference point on the nacelle 20. In an alternative embodiment, as shown in FIG. 9, the first blade azimuthal position ψ is computed using time integration of the main rotational rate Ω. In particular, a pulse generator 27 generates a synchronizing pulse when the hub azimuthal position ψ obtains a predetermined value. As an example, the placement of an inductive or optical sensor on the nacelle detecting the passage of an indicator fixedly attached to the hub provides such a synchronizing pulse. For turbines that have a main shaft attached to the hub, the indicator can alternatively be placed on this main shaft. The synchronizing pulse and the main rotational rate Ω measured by at least one pitch-angle measuring system 170 are communicated to an azimuth computational unit 650. This unit calculates an angle ξ (not shown) by integrating the rotational rate Ω in time, starting from the time instant at which the synchronizing pulse is received. The hub rotational position ψ is then determined by adding a constant angular offset $\psi_0$ (not shown) to the computed angle ξ such that the rotational position ψ takes on a predetermined value at a predetermined rotor position, $$\psi = \xi \psi_0$$

For example, the value $\psi_0$ can be chosen such that ψ=0 occurs when first blade 100 is in the vertical position, pointing upwards. The synchronizing pulse is needed to remove the accumulation of numerical errors in the time integration process. By restarting the time integration of Ω at each synchronization pulse, the length of time integration is limited to the period of one rotation of the hub, hence the unbounded accumulation of numerical error is prevented. Upon the receipt of the synchronizing signal and associated termination of the integration process for that period, the terminal value of the angle ξ is compared to the value of 2π. The difference between these two numerical values indicates the maximum error in the calculation of the rotational position ψ.

Additionally, the value of ξ can be done by assuming continuity and holds for the next revolution or also can be retroactively adjusted by linearly scaling the value ξ of over the time period between two consecutive synchronization pulses to yield a terminal value of ξ=2π for one hub rotation. In particular, if the computed value ξ takes on value $\xi_p$ (not shown) after the time period between two consecutive pulses, then the adjusted value, which we denote $\xi_A$ (not shown), is given by $\xi_A = k\epsilon$, where the scaling factor k is given by $k = 2\pi/\xi_p$ and the scaling factor ensures that $\xi_A$ attains a maximum value of 2π. Such an adjustment is beneficial when the rotational position ψ is used in non-real-time calculations that are performed at some time after the completion of the hub revolution. Furthermore, to further reduce the time integration errors, the time integration period can be reduced below that of the period of one revolution by generating additional synchronizing pulses at predetermined angular positions of the hub. Further error reduction can be achieved by taking the integrand to be an average, or other numerical combination, of the main rotational rate Ω computed by two or more pitch-angle measuring units, such as a numeric combination of main rotational rate $\Omega_{100}$ computed by angle measuring system 170, main rotational rate $\Omega_{200}$ computed by angle measuring system 270, and main rotational rate $\Omega_{300}$ computed by angle measuring system 370 (here, for clarity of notation, we have introduced the subscripts 100, 200 and 300 to denote the associated blade).

The scaling factor k is affected by temperature, and other variables that change on a time period much longer than the period of a rotor rotation. Accordingly, the value of k computed at the end of a first time period between two consecutive synchronization pulses is used during the second, successive, time period to yield a corrected value of the rotational position, $$\psi = k\epsilon + \psi_0$$

for time values between the start and the end of the second time period. At the end of the second time period the procedure is repeated, namely a new value of k is computed at the end of the second time period and is used during the third, successive, time period. Using this procedure, an improved value of the rotational position ψ can be generated instantaneously for real-time algorithms or similar uses.

In reference to FIG. 7, the inventive wind turbine comprises a blade-pitch actuator 180 for changing the blade pitch angle $\theta_1$ of the first blade 100, and a pitch control unit 182 in communication with the blade-pitch actuator 180. The pitch control unit 182 computes a commanded pitch angle $\theta_{1k}$ (not shown) required to maintain the extracted mechanical power driving the electrical generator within a desired range or value. This commanded pitch-angle $\theta_{1k}$ is communicated to the blade-pitch actuator 180, which, in turn, rotates the blade to the commanded pitch angle $\theta_{1K}$. The first computational unit 160 computes the computed pitch angle $\theta_{1C}$ and communicates $\theta_{1C}$ to the pitch control unit 182. The pitch control unit 182 compares the commanded pitch angle $\theta_{1K}$ to the computed pitch angle $\theta_{1C}$ and takes corrective measures when the deviation between $\theta_{1K}$ and $\theta_{1C}$ exceeds a predetermined value.

When the turbine has multiple blades, it is known in the art that controlling the pitch-angle of each blade, either collectively or individually, achieves best control of the total mechanical power extracted from the wind. Thus, it is most desired to apply the invention to all blades present. The first computational unit 160, the tilt-and-yaw computational unit 600, and the azimuth computational unit 650 (FIG. 9) may either be implemented as a hardware module, or as a software module.

LIST OF REFERENCE 1 wind turbine
10 tower
20 nacelle
22 tilt-rate sensor
23 yaw-rate sensor
24 hub angular encoder
27 pulse generator
30 hub
32 main rotational axis
100 first blade
110 pitch axis
130 first angular velocity sensor
140 second angular velocity sensor
150 third angular velocity sensor
160 first computational unit
170 first pitch-angle measuring system
180 blade-pitch actuator
182 pitch control unit
200 second blade
270 second pitch-angle measuring system
300 third blade
370 third pitch-angle measuring system
600 tilt-and-yaw computational unit
650 azimuth computational unit
$\Omega$ main rotational rate
$\phi$ first angular velocity
$\beta$ second angular velocity
$\lambda$ third angular velocity
$\psi$ first blade azimuthal position
$\eta$ tilting angular rate
$\gamma$ yawing angular rate
$e_1$ first sensor axis
$e_2$ second sensor axis
$e_3$ third sensor axis
$\theta_1$ first blade pitch angle
$\theta_2$ second blade pitch angle
$\theta_3$ third blade pitch angle
n unit vector along the main rotational axis
p unit vector along the tower axis
q unit vector along the nacelle tilt axis
m unit vector along the plane-normal of the plane spanned by $e_1$ and $e_2$

The invention claimed is:

1. A pitch-angle measuring system for a wind turbine having a tower, a nacelle attached thereto, a hub rotationally attached to the nacelle and defining a main rotational axis, at least one blade rotationally attached to the hub and defining a pitch axis for rotation thereabout, a blade pitch angle defining the rotational position of the at least one blade with respect to the hub about said pitch axis, the measurement system comprising:

a first angular-velocity sensor measuring a first angular velocity ($\phi$) around a first sensor axis ($e_1$), the first angular-velocity sensor fixedly attached to the at least one blade with a first predetermined orientation selected to produce a first projection of the main rotational axis onto the first sensor axis ($e_1$);

a second angular-velocity sensor measuring a second angular velocity ($\beta$) around a second sensor axis ($e_2$), the second angular-velocity sensor fixedly attached to the at least one blade with a second predetermined orientation selected to produce a second projection of the main rotational axis onto the second sensor axis ($e_2$);

the first sensor axis ($e_1$) and the second sensor axis ($e_2$) being linearly independent; and a first computational unit computing a computed pitch angle ($\theta_{1C}$) indicative of the blade pitch angle of the first angular velocity ($\phi$) and the second angular velocity ($\beta$).

2. The measuring system of claim 1, wherein the first computational unit computes the main rotational rate ($\Omega$) based on a numerical value of the first angular velocity ($\phi$) and the second angular velocity ($\beta$).

3. The measuring system of claim 1 or 2, further comprising a third angular-velocity sensor fixedly attached to the at least one blade with a third predetermined orientation and measuring a third angular velocity ($\lambda$) around a third sensor axis ($e_3$), said third predetermined orientation producing a projection of the main rotational axis onto the third sensor axis ($e_3$), the third angular velocity ($\lambda$) being communicated to the first computational unit, the first computational unit including said third angular velocity ($\lambda$) value in the computation of the computed pitch angle ($\theta_{1C}$), and said third sensor axis ($e_3$) being essentially aligned with the pitch axis.

4. The measuring system of claim 3, wherein the first sensor axis ($e_1$), the second sensor axis ($e_2$) and the third sensor axis ($e_3$) form essentially a three-dimensional orthogonal basis.

5. A pitch-angle measuring system for a wind turbine having a tower, a nacelle attached thereto, a hub rotationally attached to the nacelle and defining a main rotational axis, the hub rotating at a main rotational rate ($\Omega$), at least one blade rotationally attached to the hub and defining a pitch axis for rotation thereabout, a blade pitch angle defining the rotational position of the at least one blade with respect to the hub about said pitch axis, the measuring system comprising:

a first angular-velocity sensor measuring a first angular velocity ($\lambda$) around a first sensor axis ($e_1$), the first angular-velocity sensor fixedly attached to the at least one blade with a predetermined orientation selected to produce a projection of the main rotational axis onto the first sensor axis ($e_1$); and a first computational unit computing a computed pitch angle ($\theta_{1C}$) based on numerical values of the first angular velocity ($\phi$) and the main rotational rate ($\Omega$).

6. The measuring system of claim 5, further comprising a tilt-rate sensor which produces a tilt-rate signal indicative of a bending of the tower, a yaw-rate sensor producing a yaw-rate signal indicative of the time rate of change of an angular position of the nacelle about a tower axis, and the tilt-rate signal and the yaw-rate signal being received by the first computational unit, the first computational unit including the yaw-rate signal and the tilt-rate signal in the computation of the computed pitch angle ($\theta_{1C}$).

7. The measuring system of claim 5, further comprising a pulse generator generating a synchronizing pulse when the hub attains a predetermined azimuthal angular position relative to the nacelle, the synchronizing pulse being communicated to an azimuth computational unit, the azimuth computational unit integrating in time the main rotational rate ($\Omega$) to compute an azimuthal angle ($\xi$), the azimuth computational unit using the azimuthal angle ($\xi$) and the synchronizing pulse to compute the main rotational angle ($\psi$) of the at least one blade relative to the nacelle.

8. The measuring system of claim 5, further comprising a blade-pitch actuator for changing the blade pitch angle of the at least one blade, and a pitch control unit in communication with the blade-pitch actuator and with the first computational unit, the pitch control unit commanding the blade pitch angle to the blade-pitch actuator, the pitch control unit receiving the computed pitch angle ($\theta_{1C}$).

9. The measuring system of claim 5, further comprising an angular encoder producing an encoder signal indicative of the blade pitch angle, said encoder signal and the computed pitch angle ($\theta_{1C}$) being communicated to a first comparator unit, the first comparator unit generating a warning signal when a deviation between the encoder signal and the computed pitch angle differs by more than a predetermined amount.

10. A method for determining a pitch-angle of at least one blade of a wind turbine having a tower, a nacelle attached thereto, a hub rotationally attached to the nacelle and defining a main rotational axis, the hub rotating at a main rotational rate ($\Omega$), the at least one blade rotationally attached to the hub and defining a pitch axis for rotation thereabout, a blade pitch angle defining the rotational position of the at least one blade with respect to the hub about said pitch axis, the method for determining the pitch-angle comprising:
measuring an angular velocity relative to a sensor axis ($e_1$), said sensor axis ($e_1$) being fixedly attached to the blade at a predetermined orientation, said predetermined orientation producing a projection of the main rotational axis onto the sensor axis ($e_1$); and
computing a computed pitch angle ($\theta_{1C}$) indicative of the blade pitch angle, the computed pitch-angle ($\theta_{1C}$) being based on a numerical value of the measured angular velocity and a value of the main rotational rate ($\Omega$).

11. A method for determining a pitch-angle of at least one blade of a wind turbine having a tower, a nacelle attached thereto, a hub rotationally attached to the nacelle and defining a main rotational axis, the at least one blade rotationally attached to the hub and defining a pitch axis for rotation thereabout, a blade pitch angle defining a rotational position of the at least one blade with respect to the hub about said pitch axis, the method for determining the pitch-angle comprising:
measuring a first angular velocity relative to a first sensor axis ($e_1$), said first sensor axis ($e_1$) being fixedly attached to the blade at a first predetermined orientation, said first predetermined orientation producing a projection of the main rotational axis onto the first sensor axis ($e_1$);
measuring a second angular velocity relative to a second sensor axis ($e_1$), said second sensor axis ($e_1$) being fixedly attached to the blade at a second predetermined orientation, said second predetermined orientation producing a projection of the main rotational axis onto the second sensor axis (e1), said first sensor axis ($e_1$) and the second sensor axis ($e_2$) being linearly independent; and
computing a computed pitch angle ($e_{1C}$) indicative of the blade pitch angle, the computed pitch-angle ($\theta_{1C}$) being based on a numerical value of the first angular velocity and a value of the second angular velocity.

12. The method as claimed in claim 11, wherein a first computational unit computes the main rotational rate $\Omega$ based on a numerical value of the first angular velocity ($\phi$) and the second angular velocity ($\beta$).

13. The method of claim 12, further comprising using a third angular-velocity sensor fixedly attached to the at least one blade with a third predetermined orientation and measuring a third angular velocity $\lambda$ about a third sensor axis e3, whereby the third predetermined orientation produces a projection of the main rotational axis onto the third sensor axis e3, and the third angular velocity ($\lambda$) communicates to the first computational unit, and the first computational unit includes said third angular velocity ($\lambda$) value in the computation of the computed pitch angle ($\theta_{1C}$).

14. The method of claim 11, further comprising using a tilt-rate sensor to produce a tilt-rate signal indicative of the time rate of change of the main rotational axis orientation relative to ground due to a bending of the tower, providing a yaw-rate sensor producing a yaw-rate signal indicative of the time rate of change of the angular position of the nacelle about a tower axis, wherein the tilt-rate signal and the yaw-rate signal are received by a first computational unit and the first computational unit includes the yaw-rate signal and the tilt-rate signal in the computation of the computed pitch angle ($\theta_{1C}$).

* * * * *